C. J. BAILEY & W. JANSEN.
SPRING WHEEL.
APPLICATION FILED AUG. 27, 1908.
966,296.
Patented Aug. 2, 1910.
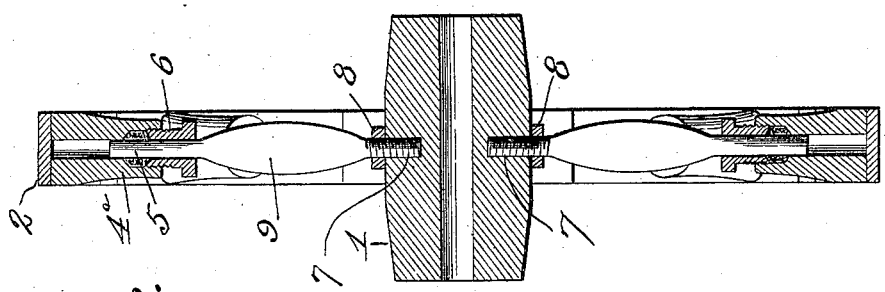
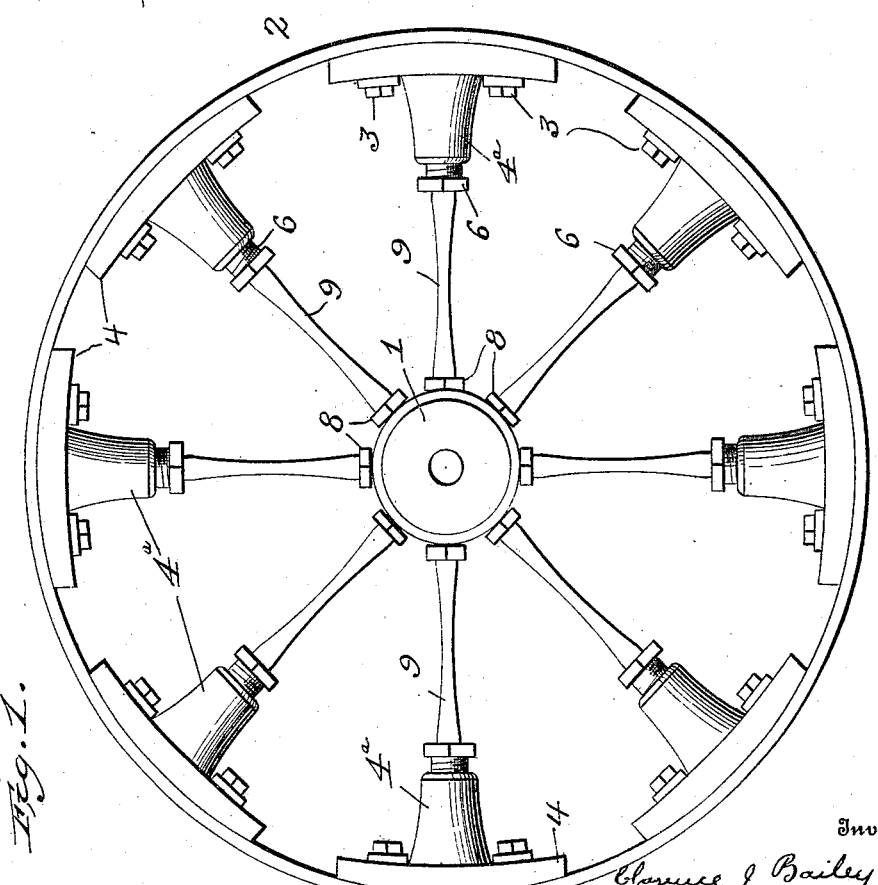

UNITED STATES PATENT OFFICE.

CLARENCE J. BAILEY AND WILLIS JANSEN, OF DRYDEN, NEW YORK.

SPRING-WHEEL.

966,296. Specification of Letters Patent. Patented Aug. 2, 1910.

Application filed August 27, 1908. Serial No. 450,463.

*To all whom it may concern:*

Be it known that we, CLARENCE J. BAILEY and WILLIS JANSEN, citizens of the United States, residing at Dryden, in the county of Tompkins and State of New York, have invented certain new and useful Improvements in Spring-Wheels, of which the following is a specification.

Our invention relates to spring wheels and has for its object to provide certain improvements in that class of wheels wherein the resiliency is supplied by the spokes as will be hereinafter more definitely set forth and claimed, reference being had to the accompanying drawing, in which:

Figure 1 is a side elevation of a spring wheel embodying our improved construction. Fig. 2 is a central vertical transverse sectional view of the same.

Similar numerals of reference denote corresponding parts in the two views.

In the said drawing, the reference numeral 1 denotes the hub of our improved wheel, the same being of the usual construction and 2 the tire thereof. Fixed to the interior of said tire, by means of the bolts 3, are a series of elongated blocks 4, each carrying a suitable socket $4^a$, adapted to receive the outer rounded ends 5 of the spokes, suitable stuffing boxes 6 being provided for said sockets, whereby said spoke ends will be freely movable endwise in said sockets and whereby access thereto of dirt will be prevented. The inner rounded ends 7 of said spokes are screw-threaded to fixedly engage the hub 1, suitable jam-nuts 8 being employed to retain them in position, said nuts affording broad lateral bearing surfaces on the hub 1, whereby the liability of loosening of the screw-threaded inner ends of the spokes in said hub, due to the lateral strains imposed thereon, is materially lessened. The intermediate portions 9 of said spokes, which are formed of metal, are flattened transversely to the axis of the rim 2, whereby upon pressure being applied to their ends they will yield in said line of axis of said tire. Said spokes so formed embody rounded ends for engaging with the hub 1 and the sockets 4, and flattened and broadened intermediate portions 9, giving the desired resiliency thereto without weakening said spokes.

From the above description it will be understood that upon a pressure being applied to the hub in any direction, say in a downward direction, the spokes lying vertical will move at their outer ends in their sockets $4^a$, while the strain will be yieldingly taken up primarily by the horizontally lying spokes, and to a lesser degree by the diagonally lying spokes, the movement of the latter being in part a bend of the parts 9 and in part an endwise movement in their sockets $4^a$.

A further and important advantage of this construction is that by employing the elongated blocks 4 the same take the place of the continuous felly usually employed to support the tire, said tire being supported directly by said blocks, as shown.

Having thus described our invention, what we claim as new and desire to secure by Letters Patent, is:

In a spring wheel, the combination with the hub, the tire, and detachable spoke receiving sockets on the interior of said tire, of a series of spokes flattened and broadened intermediate their ends transversely to the axis of said tire to form spring members, said spokes being fixed at their inner ends rigidly to said hub and engaging at their outer ends said sockets but having an endwise movement only therein, stuffing boxes for said sockets and spokes forming elongated bearings permitting an endwise movement only to said spokes, and nuts on said spokes contacting with said hub to form lateral bearing surfaces on the latter.

In testimony whereof we affix our signatures, in presence of two witnesses.

CLARENCE J. BAILEY.
WILLIS JANSEN.

Witnesses:
J. DOLPH ROSS,
AI BAILEY.